United States Patent [19]
Paddock et al.

[11] Patent Number: 4,550,138
[45] Date of Patent: Oct. 29, 1985

[54] POLYCARBONATE COMPOSITIONS WITH IMPROVED LOW TEMPERATURE IMPACT STRENGTH

[75] Inventors: Charles F. Paddock, Southbury; John M. Wefer, Newtown, both of Conn.

[73] Assignee: Uniroyal, Inc., Middlebury, Conn.

[21] Appl. No.: 603,008

[22] Filed: Apr. 23, 1984

[51] Int. Cl.$^4$ .............................................. C08L 69/00
[52] U.S. Cl. ........................................ 525/67; 525/70; 525/80
[58] Field of Search ................... 525/67, 80, 70, 148

[56] References Cited

U.S. PATENT DOCUMENTS 3,880,783  4/1975  Serini et al. ........................... 525/67
3,988,389  10/1976  Margotte et al. ................... 525/470
4,172,103  10/1979  Serini et al. ........................ 525/76

FOREIGN PATENT DOCUMENTS 48-547     7/1973   Japan .
149347     9/1982   Japan .
168937     10/1982  Japan .
1543146    3/1979   United Kingdom .

Primary Examiner—Theodore E. Pertilla
Attorney, Agent, or Firm—John A. Shedden

[57] ABSTRACT

Polycarbonate resin blended with 3–40% of AES graft copolymer containing 30–80% rubber has high impact strength without substantial loss in heat distortion temperature.

9 Claims, No Drawings

POLYCARBONATE COMPOSITIONS WITH IMPROVED LOW TEMPERATURE IMPACT STRENGTH

This invention relates to a modified polycarbonate composition having improved low temperature impact strength.

More particularly, the invention is directed to polycarbonate compositions containing relatively low levels of AES graft copolymer high in rubber content, which have been found, unexpectedly, to have outstanding low temperature impact strength while retaining the desirable properties of the polycarbonate resin, especially high heat distortion temperature.

Various polycarbonate resin-graft copolymer compositions have heretofore been proposed (e.g., U.S. Pat. No. 3,130,177, Grabowski et al., Apr. 21, 1964; U.S. Pat No. 3,988,389, Margotte et al., Oct. 26, 1976; U.S. Pat. No. 4,172,103, Serini et al., Oct. 23, 1979; British Pat. No. 1,543,146, Bayer AG, Mar. 28, 1979; U.S. application (5864) Ser. No. 423,397, Wefer, filed Sept. 24, 1982, now abandoned). Unfortunately, typical prior art compositions based on polycarbonate resin and AES graft copolymer provide poor performance relative to AES alone and polycarbonate resin alone. In general, these compositions contain less than 30% polycarbonate and/or contain low rubber content AES (less than 30% rubber). All 16 examples of British Pat. No. 1,543,146 are in this category.

In accordance with the present invention, it has been found that blends containing at least 60% polycarbonate resin and a rubber-rich (greater than 30% rubber) AES graft component show remarkable commercial utility. One key factor is that there is no substantial loss in heat distortion temperature upon the addition of up to 40% of the AES graft. Even small amounts of the graft result in a dramatic improvement in the low temperature impact strength of the polycarbonate resin. In order to provide a satisfactory balance of impact strength and hardness in this region, the AES portion must contain high levels of elastomer (greater than 30%).

In one aspect, the invention may be described as a thermoplastic blend comprising a mixture of
(A) 60–97 parts by weight of polycarbonate resin and, correspondingly,
(B) 3–40 parts by weight of AES graft copolymer containing 30–80% rubber by weight (preferably 40–70% rubber).

In general, any thermoplastic straight chain or branched polycarbonate may be used in the practice of this invention. Particularly suitable are polycarbonates based on hydrocarbon derivatives containing bis(4-hydroxyphenyl), bis(3,5-dialkyl-4-hydroxyphenyl) or bis(3,5-dihalo-4-hydroxyphenyl) substitution. Examples of such preferred hydrocarbon derivatives are 2,2-bis(4-hydroxyphenyl)-propane (bisphenol A), 2,2-bis(3,5-dimethyl-4-hydroxyphenyl)-propane, bis(3,5-dimethyl-4-hydroxyphenyl)-methane, 2,2-bis(3,5-dibromo-4-hydroxyphenyl)-propane and 2,2-bis(3,5-dichloro-4-hydroxyphenyl)-propane. Copolycarbonates employing two or more bis phenols may also be used. Polycarbonate resins are well known in the art and are described for example in British Pat. No. 772,627 and U.S. Pat. Nos. 3,544,514; 3,879,348; and 4,034,016. Bisphenol A polycarbonate is commonly used commercially and is available for example from the General Electric Company as Lexan (trademark).

The graft copolymer material (B), that is, the AES constituting the second component of the composition of the invention, is ordinarily based on a graft copolymer of resin-forming monomeric material on a rubbery unsaturated spine polymer of the ethylene-propylene-non-conjugated diene type (EPDM), although saturated rubber spine of the ethylene-propylene copolymer type (EPM) may also be used. In some cases the graft monomers may form elastomeric rather than resinous polymers. The grafted monomeric material is ordinarily at least one polar monomer such as an alkenoic nitrile, ester, amide or acid, or a vinyl aromatic monomer such as styrene; mixtures of such alkenoic monomer and vinyl aromatic monomer are particularly useful in preparing the graft copolymer. Useful monomers include such acids as acrylic and methacrylic acid, and esters of such acids including methyl, ethyl, propyl, butyl, 2-ethylhexyl and cyclohexyl esters; acrylamide and methacrylamide may be used, as well as vinyl acetate, styrene (also substituted styrenes), maleic acid anhydride, acrylonitrile, and the like. Such monomers usually comprise 20–70% (preferably 30–60%) by weight of the graft copolymer.

It will be understood that in practice the product of the graft copolymerization process is actually a mixture of true graft of resin on rubber along with a certain amount of separate, ungrafted resin (that is, the grafting efficiency is not 100%; see U.S. Pat. No. 4,202,948, Peascoe).

In preparing the graft copolymer either saturated EPM (ethylene-propylene copolymer) or unsaturated EPDM (ethylene-propylene-non-conujugated diene [e.g., ethylidene norbornene, dicyclopentadiene, hexadiene] terpolymer) may be used.

To prepare the blends of the invention, the polycarbonate resin component (A), and the graft copolymer composition (B) are mixed together at elevated temperature in conventional plastics mixing equipment, such as a batch mixer or twin screw extruder-mixer.

One desirable mixing procedure is a two-step compounding process involving first working the graft copolymer composition (B) without the polycarbonate (A) under shearing and fluxing conditions, for example in a twin screw extruder-mixer. This disperses the EPDM within the resin contained in the graft copolymer composition, to form an "inverted" composition in which the EPDM rubber is the discontinuous phase. The second step involves fluxing the inverted graft component (B) with the polycarbonate component (A) under lower shear conditions, for example in a single screw extruder. In commercial practice these two steps can be combined in one extrusion operation, using an extruder having a first and second feedport; a section of the extruder downstream of the first feedport can be used to shear (invert) the graft copolymer (B) and a section downstream of the second feedport can be used to mix the graft with the polycarbonate (A).

The inverted graft composition may also be pelletized and tumble blended with polycarbonate pellets to form a physical mixture which can be fed into an injection molding machine or an extruder. In this case the plasticizing screw of the injection or extrusion machine can perform the second stage of mixing during fabrication.

If the graft copolymer is not subjected to a preliminary separate inversion step (shearing and fluxing) to disperse the rubber prior to blending with the polycarbonate comonent, then the blending should be carried out under sufficiently severe and prolonged mixing conditions (e.g. in a Brabender type mixer) to disperse the rubber thoroughly within the mixture as a finely dispersed phase.

Particularly desirable products are those in which the grafting monomers are styrene/acrylonitrile, styrene/methyl methacrylate, and methyl methacrylate. In the preferred practice of the invention, all of the resin-forming component of the graft copolymer is graft copolymerized in situ in the presence of the rubber spine, that is, there is no blending of the graft copolymer with additional separately prepared resin. British Pat. No. 1,543,146 discloses both the blending of high rubber grafts with additional resin and the preparation of in situ low rubber grafts as alternative methods for producing low rubber AES. Such low rubber content AES is not capable of providing the present improved results.

The advantageous combination of properties found in the compositions of the present invention are a consequence of the surprising ability of even low levels of the grafts to make dramatic improvements in the low temperature impact of polycarbonate. Such compositions have heat distortion temperatures only slightly lower than that of unmodified polycarbonate.

The following examples will serve to illustrate the practice of the invention in more detail.

EXAMPLE 1

Twenty-two blends having the compositions indicated in Table I (in parts by weight) are prepared using two different polycarbonate resins (A and B) based on bisphenol A. Polycarbonate A is a UV stabilized extrusion type, Lexan (trademark) 103, and polycarbonate B is an injection molding type, Lexan 145. AES composition D (graft copolymer of styrene/acrylonitrile in 72/28 weight ratio on an ethylene-propylene-ethylidene norbornene terpolymer rubber; E/P ratio 60/40 by weight; iodine number 20; Mooney viscosity 68 ML-4 at 257° F.) was prepared according to U.S. Pat. No. 4,202,948 (Peascoe). AES compositions A, B and C, containing 20, 30, and 40% EPDM, respectively, are prepared from AES D by mixing with SAN resin (Tyril 880B [trademark]; 72/28 S/AN ratio; 0.75 intrinsic viscosity in DMF at 30° C.) in a Werner and Pfleiderer twin-screw extruder equipped with strand die and pelletizer.

The blends shown in Table I are prepared by mixing AES compositions A through D with polycarbonate A or B in a Brabender-type mixer at 205° C. jacket temperature. Test specimens are cut from ⅛ inch compression molded plaques. Notched Izod impact at room temperature and −20° F. (ASTM D-256), annealed heat distortion temperature (HDT) at 264 psi (ASTM D-648) and Rockwell-R hardness (ASTM D-785) are reported in Table I.

In Table I, compositions 18 through 21 are within the scope of the invention; the other compositions are controls included for purposes of comparison. Composition 1 is AES B alone; composition 22 is polycarbonate A alone. As is apparent from the trends in the Table, optimum results (good low temperature impact coupled with high HDT and high hardness) are obtained when the polycarbonate content is over 50% of the total composition (18–21 versus 2–17) and where the AES portion is relatively high in EPDM (compare the trend of 18 versus 19 and 20 versus 21).

EXAMPLE 2

Table II presents a series of blends which investigates in more detail the trends indicated in Table I, namely, compositions containing higher levels of polycarbonate and grafts (styrene/acrylonitrile, styrene/methylmethacrylate and methyl methacrylate) containing relatively high levels of EPDM. The grafts A through D are prepared according to U.S. Pat. No. 4,202,948 (Peascoe), Example 2, with all of the grafting resins being polymerized in situ. To make blends 3–17 the graft copolymers A through D are first fluxed in a 53 mm Werner and Pfleiderer twin-screw extruder equipped with a strand die and pelletizer. The pelletized grafts are then fluxed in a 1-inch single screw extruder with either of two bis-phenol A polycarbonates (polycarbonate A and B), in the proportions indicated in Table II in parts by weight. To make blends 18 and 19 the grafts (without any pre-processing) are fluxed with polycarbonate A in a Brabender-type mixer using a 10-minute cycle, 90 rpm, and 205° C. jacket temperature. Blends 18 and 19 were granulated in a mechanical grinder. Polycarbonate A is a UV-stabilized extrusion type (LEXAN 103 [trademark]) and polycarbonate B is a general purpose molding type (Lexan 141 [trademark]). Specimens for mechanical property testing are cut from ⅛ inch injection molded plaques.

Compositions 7 through 19 in Table II represent the practice of the invention and compositions 1 through 6 are for purposes of comparison. Compositions 1 and 2 are unmodified polycarbonate A and B, respectively, and compositions 3 through 6 represent blends containing only trace amounts (1–2.5%) of graft copolymer which is insufficient to cause dramatic improvement in low temperature impact. Note that compositions 7–19, within the practice of the invention, have dramatically improved low temperature impact versus unmodified polycarbonate even at relatively small loadings of the graft. Composition 7, for example, containing only 5% graft A (EPDM/SAN) has nearly five times the impact of unmodified polycarbonate at −20° F. Composition 8, containing 10% graft A has five to six times the impact of unmodified polycarbonate at −20° and −40° F.

It is also be be noted in Table II that the compositions of the invention have heat distortion temperatures only slightly below that of unmodified polycarbonate.

TABLE I

| POLYCARBONATE-AES COMPOSITIONS | | | | | | | | | | | |
|---|---|---|---|---|---|---|---|---|---|---|---|
| | 1 | 2 | 3 | 4 | 5 | 6 | 7 | 8 | 9 | 10 | 11 |
| AES A | | 75 | | | | | 62.5 | | | | |
| AES B | 100 | | 75 | 75 | | | | 62.5 | 62.5 | | |
| AES C | | | | | 75 | | | | | 62.5 | |
| AES D | | | | | | 75 | | | | | 62.5 |
| Polycarbonate A | | | | 25 | | | | | 37.5 | | |
| Polycarbonate B | | 25 | 25 | | 25 | 25 | 37.5 | 37.5 | | 37.5 | 37.5 |
| Notched Izod (ft-lb/in) | | | | | | | | | | | |
| RT | 12.2 | 1.4 | 5.4 | 2.5 | 8.0 | 10.2 | 4.1 | 10.7 | 7.9 | 9.9 | 12.6 |

TABLE I-continued
POLYCARBONATE-AES COMPOSITIONS

|  |  |  |  |  |  |  |  |  |  |  |
|---|---|---|---|---|---|---|---|---|---|---|
| −20° F. | 6.8 | 0.3 | 1.3 | 1.4 | 5.1 | 14.1 | 0.5 | 1.3 | 2.1 | 8.2 | 12.8 |
| Rockwell R | 72 | 104 | 88 | 90 | 52 | TS | 108 | 96 | 97 | 71 | 50 |
| HDT 264 psi annealed (°F.) | 199 |  |  | 212 |  |  |  |  | 216 |  |  |

|  | 12 | 13 | 14 | 15 | 16 | 17 | 18 | 19 | 20 | 21 | 22 |
|---|---|---|---|---|---|---|---|---|---|---|---|
| AES A | 50 |  |  |  |  |  |  |  |  |  |  |
| AES B |  | 50 | 50 |  |  |  |  |  |  |  |  |
| AES C |  |  |  | 50 | 50 |  | 37.5 |  | 25 |  |  |
| AES D |  |  |  |  |  | 50 |  | 37.5 |  | 25 |  |
| Polycarbonate A |  |  | 50 |  | 50 |  | 62.5 | 62.5 | 75 | 75 | 100 |
| Polycarbonate B | 50 | 50 |  | 50 |  | 50 |  |  |  |  |  |
| Notched Izod (ft-lb/in) |  |  |  |  |  |  |  |  |  |  |  |
| RT | 6.1 | 10.6 | 11.1 | 12.1 | 11.0 | 12.1 | 11.7 | 12.2 | 12.8 | 12.9 | — |
| −20° F. | 0.7 | 3.3 | 2.1 | 10.8 | 3.3 | 15.4 | 3.6 | 5.7 | 7.2 | 10.6 | — |
| Rockwell R | 112 | 103 | 104 | 88 | 85 | 77 | 102 | 96 | 113 | 108 | — |
| HDT 264 psi annealed (°F.) |  |  | 217 |  | 216 |  | 246 | 246 | 257 | 257 | 270 |

AES A 20% EPDM
AES B 30% EPDM
AES C 40% EPDM
AES D 50% EPDM
Polycarbonate A Lexan 103
Polycarbonate B Lexan 145
TS - Too soft to measure

TABLE II
POLYCARBONATE-AES COMPOSITIONS

|  | 1 | 2 | 3 | 4 | 5 | 6 | 7 | 8 | 9 | 10 |
|---|---|---|---|---|---|---|---|---|---|---|
| GRAFT A |  |  | 1 | 1 | 2.5 | 2.5 | 5 | 10 | 20 | 20 |
| POLYCARBONATE A | 100 |  | 99 |  | 97.5 |  | 95 | 90 | 80 |  |
| POLYCARBONATE B |  | 100 |  | 99 |  | 97.5 |  |  |  | 80 |
| NIRT (ft-lb/in) | 19.4 | 16.8 | 19.7 | 17.3 | 19.3 | 17.2 | 17.9 | 16.8 | 16.0 | 13.8 |
| NI −20° F. | 3.2 | 2.9 | 3.1 | 3.3 | 4.5 | 7.4 | 15.1 | 16.1 | 9.5 | 11.3 |
| NI −40° F. | 2.6 | 2.5 | 2.6 | 3.2 | 3.3 | 4.0 | 4.4 | 15.2 | 10.9 | 8.0 |
| Rockwell - R | 123 | 121 | 122 | 122 | 122 | 120 | 121 | 119 | 111 | 113 |
| HDT @ 264 psi annealed* (°F.) | 278 | 280 |  |  |  |  |  |  | 272 | 275 |

|  | 11 | 12 | 13 | 14 | 15 | 16 | 17 | 18+ | 19+ |
|---|---|---|---|---|---|---|---|---|---|
| GRAFT A |  |  |  |  |  |  |  | 20 |  |
| GRAFT B | 5 | 10 | 20 |  |  |  |  |  |  |
| GRAFT C |  |  |  | 5 | 10 | 20 |  |  | 20 |
| GRAFT D |  |  |  |  |  |  | 5 |  |  |
| POLYCARBONATE A | 95 | 90 | 80 | 95 | 90 | 80 | 95 | 80 | 80 |
| NIRT (ft-lb/in) | 17.8 | 18.4 | 17.9 | 17.3 | 17.3 | 15.2 | 16.9 | 16.8 | 16.0 |
| NI −20° F. | 8.7 | 13.9 | 12.3 | 13.9 | 13.7 | 12.0 | 17.3 | 15.1 | 13.7 |
| NI −40° F. | 4.3 | 8.4 | 6.6 | 6.1 | 13.6 | 10.1 | 4.8 | 11.4 | 10.3 |
| Rockwell - R | 121 | 119 | 111 | 119 | 118 | 113 | 117 | 110 | 115 |
| HDT @ 264 psi annealed* (°F.) |  | 277 |  | 271 | 272 | 264 | 277 |  |  |

GRAFT A = EPDM/Styrene/Acrylonitrile (50/36/14)
GRAFT B = EPDM/Styrene/Methylmethacrylate (50/25/25)
GRAFT C = EPDM/Methyl Methacrylate (50/50)
GRAFT D = EPDM/Methyl Methacrylate (70/30)
POLYCARBONATE A = LEXAN 103
POLYCARBONATE B = LEXAN 141
*2 hr. @ 248° F.
+Brabender mixed without pre-shearing graft

What is claimed is:

1. A blend comprising a mixture of
   (A) 60–97% by weight of a polycarbonate resin and, correspondingly,
   (B) 40–3% by weight of a graft copolymer of at least one monomer selected from alkenoic nitriles, esters, amides or acids, vinyl aromatic monomers, and maleic anhydride on an olefin elastomer selected from ethylene/propylene/diene terpolymer rubber and ethylene/propylene copolymer, said graft copolymer containing 30–80% olefin elastomer by weight.

2. A blend as in claim 1 in which all of the monomers in the graft copolymer (B) are polymerized in the presence of the olefin elastomer.

3. A blend as in claim 1 in which the graft copolymer (B) contains 40–70% rubber.

4. A blend as in claim 1 in which the polycarbonate (A) comprises 75–97% of the total and the graft copolymer (B) comprises, correspondingly, 25–3% of the total.

5. A blend as in claim 1 in which the at least one monomer in the graft copolymer (B) is styrene/acrylonitrile, methyl methacrylate, or styrene/methyl methacrylate.

6. A blend as in claim 1 in which the polycarbonate (A) is derived from 2,2-bis(4-hydroxyphenyl)-propane (bisphenol A).

7. A blend as in claim 1 in which the olefin elastomer is EPDM.

8. A blend as in claim 3 in which the graft copolymer (B) is subjected to shearing and fluxing conditions so as to form an inverted composition in which the olefin elastomer is the dispersed phase, before or during blending with the polycarbonate (A).

9. A blend comprising a mixture of
(A) 80-95% by weight of a polycarbonate resin derived from 2,2-bis(4-hydroxyphenyl)-propane and, correspondingly,
(B) 20-5% by weight of a graft copolymer of at least one monomer selected from styrene/acrylonitrile, methyl methacrylate, or styrene/methyl mechacrylate on an ethylene/propylene/diene terpolymer elastomer, said graft copolymer containing 50-70% elastomer by weight,
all of the monomers in the graft copolymer (B) having been polymerized in the presence of the elastomer, and the graft copolymer (B) having been subjected to shearing and fluxing conditions so as to form an inverted composition in which the elastomer is the dispersed phase, before or during blending with the polycarbonate (A).

* * * * *